United States Patent [19]

Zahradnik

[11] 4,247,206
[45] Jan. 27, 1981

[54] SCREW EXTRUDER FOR THE PROCESSING OF THERMOPLASTIC RESINS AND SIMILAR MATERIALS

[75] Inventor: Rudolf Zahradnik, Vienna, Austria

[73] Assignee: Maplan Maschinen- und Technische Anlagen Planungs- und Fertigungs-Gesellschaft m.b.H, Vienna, Austria

[21] Appl. No.: 17,834

[22] Filed: Mar. 6, 1979

[30] Foreign Application Priority Data

Mar. 7, 1978 [AT] Austria ................................. 1624/78

[51] Int. Cl.³ ............................................... B28C 1/16
[52] U.S. Cl. ..................................... 366/83; 366/323
[58] Field of Search ..................... 366/83, 84, 89, 85, 366/96, 97; 425/207–209, 200, 204

[56] References Cited

U.S. PATENT DOCUMENTS

| | | | |
|---|---|---|---|
| 3,734,472 | 5/1973 | Strohmeier | 366/83 |
| 3,782,700 | 1/1974 | Wittrock | 366/83 |
| 4,047,705 | 9/1977 | Hanslik | 366/85 |

Primary Examiner—Robert W. Jenkins
Attorney, Agent, or Firm—Montague & Ross

[57] ABSTRACT

A screw extruder of the type in which a pair of counter-rotating screws of progressively increasing diameter plasticize and extrude thermoplastic resins and in which an equal ratio of power conversion in shear and convective heating to throuput of material is obtained over the length of the screws.

3 Claims, 2 Drawing Figures

SCREW EXTRUDER FOR THE PROCESSING OF THERMOPLASTIC RESINS AND SIMILAR MATERIALS

FIELD OF THE INVENTION

This invention relates to a screw extruder for the processing of thermoplastic resins and similar materials, having at least two intermeshing conical screws of opposite direction of rotation, in which the transport of the material takes place from the large diameter to the small diameter and the depth of thread increases with the increase in diameter of the screw.

Background of the Invention

Screw extruders of the type and manner of use indicated are known, in particular, in two embodiments.

In one of these embodiments, the depth of thread is practically invariable over the entire length of the screws, as a result of which the most favorable ratio of diameter to depth of thread can be maintained generally only in the ejection region while, due to the high circumferential speed and the low thread-depth ratio a higher shearing speed is obtained in the feed region. This leads to an increased input of energy as positive phenomenon, but on the other hand also to substantial disadvantages due to the strong radial shearing of the plastic which in its solid and semi-plastic condition is heated predominantly only in the edge regions. Since thermoplastics are generally poor conductors of heat, the material is heated non-uniformly over the cross section of the thread of material as a result of which a dishomogeneity, which is injurious to the structure, is produced even at the start of the plasticizing process. As further disadvantage, mention must be made here of the early wear of screws and cylinders. In the calculation of the life of plasticizing screws the specific pressure which is produced by the drag flow between screw and cylinder plays a major role. The material present in the screw housing is to the greater part carried along by the screws. The relatively small roll and side clearances resulting from the meshing of the screws however permit the passage of only a small part thereof, as a result of which the rotation of the material comes in part to a halt. The material which is held up in this manner produces a pressure flow in the screw thread in the direction opposite the direction of rotation of the screw. The pressure increases with the circumference of the screw and decreases with the width and depth of thread. If the smallest and largest diameters of a conical screw are in a ratio of 1:2 there is a corresponding pressure build-up, depending on the diameter-thread width and depth ratio, which leads to a strong pressing of the rotating screws against the wall of the cylinder. If the depth of thread at the large screw diameter remains the same as that at the small diameter, then the pressure is increased several times, depending on the flow properties of the thermoplastic and the width of thread, which leads to early wear of cylinder and screws.

The second type of screw design has a diameter/thread-depth ratio which is invariable over the entire length of screw. The deep screw threads in the feed region, particularly in the case of a large screw diameter, result in a large content of material. The advantage lies here in the resultant longer residence time with less energy input by the screw drive and more energy input by the heating of the material by means of the heated cylinder housing. In the case of large high-speed conical screws of this type, however, in the same way as in the case of large cylindrical screws, disadvantages in homogenization have resulted, due to the extensive cross sections of material. With excessively large material flow passages it is not possible to make the drag and pressure flows uniform over the entire cross section, so that once again a different temperature of the material results due to the poor heat conduction of the plastic.

While too much energy is produced by shearing in the first embodiment at higher screw speeds of rotation, the shear energy in the case of the second embodiment remains greatly below the desired amount. In both cases this constitutes an uneconomic upper limitation of the speed of rotation.

The cause of the difference in energy feed with increasing speed of rotation resides, in part, in the surface-bound heating energy, which can be increased only to a slight extent with the speed of revolution of the material, and the shear resistance, which increases with the speed of rotation. In the case of cylindrical worms, as a result of this experience, the depths of thread are made percentually less deep with large screw diameters.

Object of the Invention

The object of the invention is to provide screw extruders having at least two oppositely rotating conical screws which do not have the aforementioned disadvantages of too low or too high an energy conversion in the region of the large diameter, nonhomogeneity due to excessive shearing in the solid state of the powder or due to excessively large screw threads and premature wear of the plasticizing elements by too great a pressure build-up because of excessively small thread depths in the region of the large diameter.

Summary of the Invention

This object is achieved in accordance with the invention by constructing screws with respect to the depth of thread in such a manner that the local energy conversion corresponds to the local material throughput along the entire screw length.

Accordingly, the screw extruder of the invention is characterized, in particular, by the fact that in order to obtain an identical ratio of power conversion by shear and convection heating to throughput of material over the entire length of the screw the ratio of depth of thread increase to the smallest depth is 50-75% of the ratio of the increase in screw diameter to smallest screw diameter.

Further characteristics of the screw extruder of the invention are that the clearance between outside diameter of the one screw and root diameter of the engaging screw at the individual zones of the screw is unchanged over the entire length of the individual zone in known manner, and that the thread (pitch) angles in the individual zones are in known manner different and preferably amount to 10°–20°.

With the screw extruder of the invention, the aboveindicated disadvantages have been eliminated, uniform plasticizing of the material passed through is obtained, and the friction is maintained within limits.

AT-Pat. No. 295 122 concerns a screw extruder for plastics having conical auxiliary screws and a cylinder surrounding the screws, the invention residing in the fact that the cylinder is constructed as a single piece and the axis of the main screw forms an angle of 3° to 5° with the axis of each auxiliary screw. In this way, it is intended to eliminate assembly and sealing problems. The said patent has nothing at all to do with an adapting of the power conversion by shearing and convective heating to the throughput by means of a change of the thread depth of the screws with respect to their diameter; it can be noted from the drawings that the thread-depth ratio increases somewhat more strongly than the diameter ratio, which is not in accord with the design pursuant to the invention.

West German Unexamined Application for U.S. Pat. No. 24 46 420 (see U.S. Pat. No. 4,047,705) concerns a screw extruder having at least two interengaging screws with opposite direction of rotation which taper conically towards the extrusion end. The invention resides in the fact that for each of the interengaging screws the ratio of meshing surface to local outside diameter is at least approximately constant over the entire range of speed of rotation and the entire length of the screw. This design is directed at substantially better economy. As its advantages there are indicated higher volume reserve and output in the gassing zones, greater control range, insensitivity to speed of rotation, shorter construction, and more uniform compression. This, in its turn, has nothing to do with adapting the power conversion by shearing and convective heating to the throughput by means of a change in the depth of thread of the screws in relation to their diameter; nor are any such matters discussed in the publication. In this construction, it is true, the depth of the material threads as well as the root and outside diameters of the screws also decrease in the direction of conveyance but from the drawing there can be noted a ratio which is higher than the range in accordance with the invention. Thus there is nothing in common between West German Unexamined Application for U.S. Pat. No. 24 46 420 and the present invention and the most that can be noted, as known from said publication, is that the clearance between outside diameter of the one screw and the root diameter of the engaging screw remains the same. The apparatus in accordance with West German Unexamined Application for U.S. Pat. No. 24 46 420 operates satisfactorily in the case of larger models only with low speeds of rotation and good convective heating while with a higher speed of rotation operation in the plastic region is no longer possible. Similarly, only small axis angles are possible in the known apparatus. These disadvantages are avoided in the apparatus of the invention; a satisfactory uniform plasticizing can be obtained even in larger models with higher speeds of rotation and higher temperature.

West German Pat. No. 883 338 concerns a screw extruder with screws rotating in the same direction and therefore in its very type it does not correspond to the design in accordance with the invention. The outside diameter of the screw thread decreases towards the outlet opening to the same extent as the screw diameter increases. It is stated that the desired increase in pressure can also be obtained by gradual decrease of the height of screw thread in the direction towards the outlet end. This, however, is known and has nothing to do with the invention. It can possibly be noted from West German Pat. No. 883 338 that in the case of screws which rotate in the same direction different thread angles over their length are known.

Finally, U.S. Pat. No. 2 466 934 concerns a plastic extruder with conical screws, the invention being directed at the development of the housing. In the screws which do not mesh with each other, the depth of thread decreases in each case with the diameter of the screw in the direction of conveyance. It can be noted from the drawings that the depth of thread increases proportionally more strongly than the diameter in the opposite direction. This has nothing to do with the present invention.

In rheological studies it has been found that thermoplastics of PVC, PE and other types, in plastic and semi-plastic condition, lie, with respect to their flow rate in case of combined shear and surface sliding, between solids and Newtonian fluids. In the case of solids, the energy requirement, as a result of the frictional resistance, increases linearly with the speed of the mass movement. In the case of Newtonian fluids such as water, it increases with the square of the velocity and in the case of masses of structural viscosity such as PVC the exponent of the speed is 1.2 to 1.6. The energy conversion due to the shearing output is therefore a function of the circumferential speed to the 1.2 to 1.6th power.

In the heating and pre-plasticizing zones, the heating power fed upon increase in speed of rotation and shortened time of dwell of the mass becomes greater due to the faster movement of the mass past the wall of the cylinder but drops as compared with the quantity throughput. In similar manner, the specific heat output decreases when the screw diameter, the pitch, and the thread depth are increased in the same ratio.

If screw diameter, depth of thread, and pitch remain in the same ratio, the quantity throughput is a function of the third power of the diameter. However, if the depth of thread remains the same upon an increase in diameter, then the throughput increases only with the square of the diameter.

Since the peripheral speed and the shearing surface are dependent in their turn on the diameter, the energy conversion by shearing can thus be approximately a function of $d^3$ to $d^4$.

The theoretical proof of the retarding or increasing of the specific convective energy input and of the changing specific energy conversion by shear at different peripheral speeds can be found only approximately, since the interactions within the screw are very complicated and the flow properties in the case of the individual thermoplastics and different temperatures are different. The flow behavior of the thermoplast plays a controlling part, so that the value of the increase of the shear stress with the rate of shearing of the mass to be processed can also be used for the determination of the diameter/thread-depth ratio.

The comparison of the power of conversion by shearing as compared with the throughput of material can be represented by the following formula.

The power requirement N in case of drag flow is $N = F \cdot \eta_w \cdot V$ for the material throughput Q we have $Q = d \cdot \tau \cdot t \cdot n \cdot \mu$ in which furthermore
$F = d \cdot \pi \cdot b,$
$V = d \cdot \pi \cdot n$
and
$\tau_w = \tau_1 (V/t) a.$ In the formulas the symbols have the following meaning?
N = power F = shear surface
$\tau_w$ = shear stress for a given shear rate
$\tau_1$ = shear stress at the shear rate = $1\ s^{-1}$
V = circumferential velocity
d = mean screw diameter
b = width of the screw thread
t = depth of thread
a = flow exponent
n = speed of rotation
$\mu$ = efficiency.

If N, d, n·t are used as proportionality constants of two screw geometries, the formula for the change in power is:

$$N = \frac{d^{2+a}}{t^a}$$

For an average PVC mix, we can assume a value of a = 0.3.

If two screws are compared in a diameter ratio of 1:2, there is obtained, with respect to the throughput, a strongly varying conversion of power per unit of length when the thread depth of the larger screw is made variable. The following possibilities are assumed:

1. The depth of thread remains the same: material throughput ratio 1:2 power conversion ratio 1:4.92
2. The depth of thread increases in accordance with the diameter ratio pursuant to West German Unexamined Application for Patent 24 46 420 (U.S. Pat. No. 4,047,705):
material throughput ratio 1:4
power conversion ratio 1:4
3. The depth of thread increases for the large diameter in accordance with the invention by 70% of the increase in diameter:
material throughput ratio 1:3.4
power conversion ratio 1:4.2

In Example 1, a 2.46×specific increase in power is absolutely too high. In Example 2 it remains the same, which however is not sufficient in case of a reduction of the heating power with deeper threads. The increase in Example 3 by 24% is approximately the replacement for the specifically reduced heating power so that the total energy feed again corresponds to the material throughput, which in the broader sense also serves to promote homogeneous plasticizing.

In accordance with the invention we thus have:

$$m \cdot \frac{A - B}{B} = \frac{C - D}{D}$$

in which m = 0.5 to 0.75.

In the formula, A is the largest screw diameter and B the smallest, C is the depth of thread at A, and D is the depth of thread at B.

The most favorable values for Pb-stabilized PVC are m = 0.78, for normal polyethylene 0.68, and for polyethylene of low melt index down to m = 0.5.

By way of example, in the case of a maximum screws diameter A of 100 mm and a minimum screw diameter B of 50 mm as well as a minimum thread depth D of 11.5 mm there would be a maximum thread depth of 18 mm within the region in accordance with the invention (m = 0.565).

Extrusion presses of the design in accordance with the invention process the plasticized product, even with higher speed of rotation, more homogeneously than the apparatus known up to now. The screws operate more economically since, due to the greatest possible adaptation of the thread depth, a wide range of recipes can be handled, even with one screw. With the invention, advances are obtained both in the direction of improved quality and in the direction of higher output. Due to the uniform shearing, local surface stressing by pressure and friction is also avoided and the life of housing and screws is considerably increased.

SPECIFIC DESCRIPTION AND EXAMPLES

Figure 1:
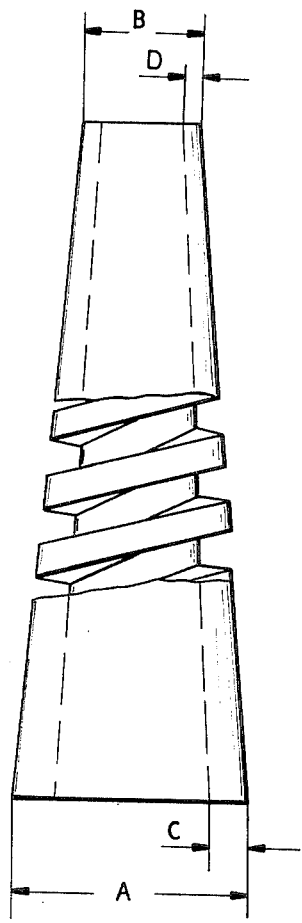
FIG. 1 shows in elevation an individual conical screw.
Figure 2:
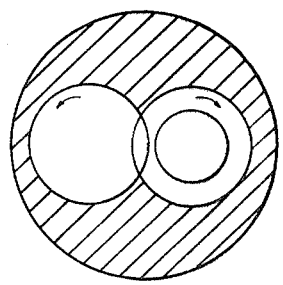
FIG. 2 is a cross section through a housing having two oppositely rotating screws.

The invention will be explained in greater detail below with reference to results of extruder tests with different screw diameters and plastic compositions.

As plastic compositions there are used: mixture 1 ($M_1$): rigid PVC, Pb-stabilized, with internal and external lubricant, medium-heavy travel in the extruder. Mixture 2 ($M_2$) rigid PVC, Sn-stabilized, with wax additions, medium-easy travel in the extruder. Mixture 3 ($M_3$): plasticized PVC with filler (50 parts PVC, 30 parts plasticizer, 20 parts chalk).

(1) Extruder with small screw: (d = 80 mm, t = 17 mm)
Energy input distribution in %

|  | $M_1$ | $M_2$ | $M_3$ |
|---|---|---|---|
| Shear (extrusion zone) | 52 | 46 | 46 |
| Shear preplasticizing zone | 22 | 25 | 24 |
| Heating preplasticizing zone | 26 | 29 | 30 |

2(a) Extruder with large screw: (d = 125 mm, t = 24.2 mm) Energy input distribution

|  | $M_1$ |
|---|---|
| Shear extrusion zone | 54 |
| Shear preplasticizing zone | 26 |
| Heating preplasticizing zone | 20 (m = 0.75) |

2(b) Extruder with large screw: (d = 120 mm, t = 22.5 mm)

|  | $M_2$ |
|---|---|
| Shear extrusion zone | 49 |
| Shear preplasticizing zone | 30 |
| Heating preplasticizing zone | 21 (m = 0.65) |

2(c) Extruder with large screw: (d = 122 mm, t = 21.5 mm)

|  | $M_2$ |
|---|---|
| Shear extrusion zone | 44 |
| Shear preplasticizing zone | 33 |
| Heating preplasticizing zone | 22 (m = 0.50) |

I claim:

1. A screw extruder for processing a thermoplastic resin comprising two conical counter-rotating screws having interengaging threads and a thread depth progressively increasing toward the larger end of each screw, each screw having an outer diameter A at its larger end and an outer diameter B at its smaller end, the thread depth of each screw increasing from a depth D at the smaller end to a depth C at its larger end, the dimensions A, B, C and D being in the relationship:

$$m \cdot \frac{A - B}{B} = \frac{C - D}{D}$$

where m=0.5 to 0.75 and selected in accordance with the rheological characteristics of the resin that the power conversion by shearing and convective heating is in a substantially constant ratio to the throughput of the resin over the entire lengths of the screws.

2. The screw extruder defined in claim 1 wherein the clearance between the outside diameter of one screw and the root diameter of the other screw remains substantially constant over the entire length of the screws in the regions in which the threads of said screws engage.

3. The screw extruder defined in claim 2 wherein the pitch angles of said screws are between substantially 10° and 20°.

* * * * *